US009286177B1

(12) United States Patent
Pritchard et al.

(10) Patent No.: US 9,286,177 B1
(45) Date of Patent: Mar. 15, 2016

(54) S-PARAMETER ANALYSIS TOOL

(71) Applicant: EMC Corporation, Hopkinton, MA (US)

(72) Inventors: Jason Pritchard, Hopkinton, MA (US); Rohit Mundra, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 171 days.

(21) Appl. No.: 13/730,451

(22) Filed: Dec. 28, 2012

(51) Int. Cl.
*G06F 11/00* (2006.01)
*G06F 11/22* (2006.01)

(52) U.S. Cl.
CPC .................... *G06F 11/221* (2013.01)

(58) Field of Classification Search
CPC ............ G06F 11/0745; G06F 11/221; G06F 11/0793; H04L 12/2697; H04L 43/50
USPC .......................................... 714/43
See application file for complete search history.

(56) References Cited

U.S. PATENT DOCUMENTS

| 5,519,331 | A | * | 5/1996 | Cowart | ............... | G01R 1/0408 324/756.02 |
| 2002/0063568 | A1 | * | 5/2002 | Hung | ................... | G01M 11/00 324/750.11 |
| 2006/0082378 | A1 | * | 4/2006 | Majerus | ............ | G01R 31/2837 324/756.07 |
| 2010/0233969 | A1 | * | 9/2010 | Frolik et al. | ............... | 455/67.14 |
| 2012/0264470 | A1 | * | 10/2012 | Bajj et al. | ..................... | 455/509 |

OTHER PUBLICATIONS

Dictionary definition of Network analyzer page of May 6, 2012, retrieved using the way back machine from https://web.archive.org/web/20120506162136/http://en.wikipedia.org/wiki/Network_analyzer_(electrical).*

* cited by examiner

*Primary Examiner* — Yair Leibovich
(74) *Attorney, Agent, or Firm* — Krishnendu Gupta; Konrad R. Lee

(57) ABSTRACT

A computer-executable method, apparatus, or computer program product for automating the analysis of interconnects used with data storage systems, where one or more measured parameters, such as an S-parameter, may be used to determine signal characteristics of the interconnects.

18 Claims, 11 Drawing Sheets

S-PARAMETER ANALYSIS TOOL

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available. Each of the storage devices, processors, and other electronics within a data storage system may be connected using one or more interconnects. Each interconnect may enable processors, storage devices, and other electronics that may be part of a data storage system to communicate with each other.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, apparatus, and computer program product for analyzing an interconnect using a vector network analyzer, including providing one or more parameters; analyzing the one or more parameters to determine a characteristic of the interconnect; and outputting the characteristic of the interconnect.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
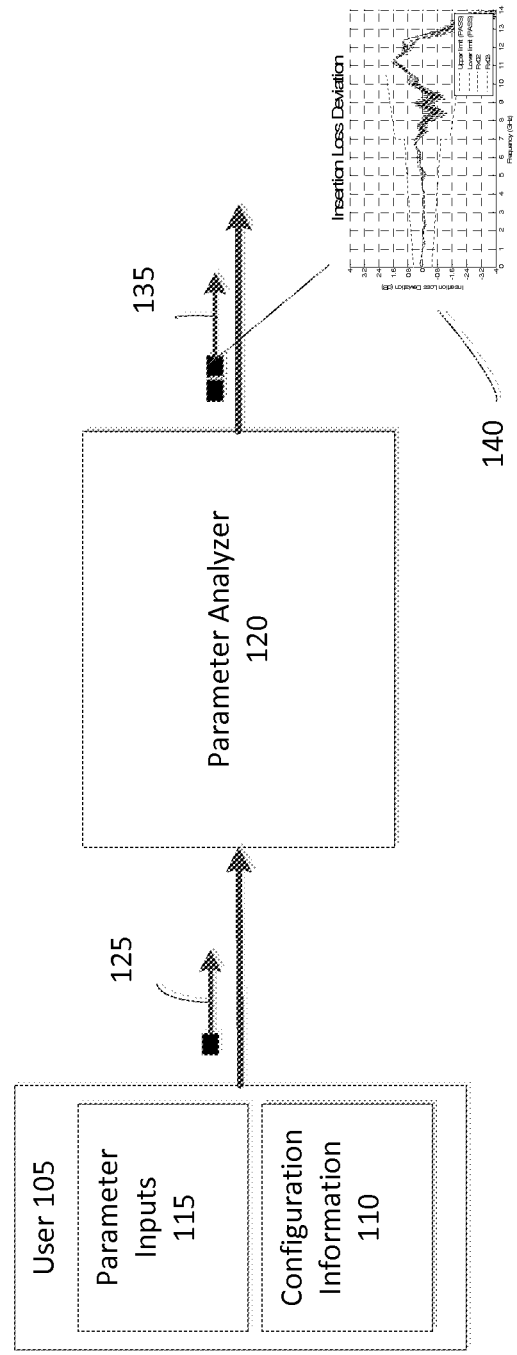
FIG. 1 is a simplified illustration of an S-Parameter Analysis Tool, in accordance with an embodiment of the present disclosure.

Typically, a data storage system may contain hundreds of interconnects throughout the entire system. Conventionally, analyzing each interconnect throughout an entire data storage system may be problematic. Generally, former approaches may have involved manual processing of data files in S-parameter viewers. Conventionally, multiple plots, such as integrated crosstalk noise, fitted insertion loss, and insertion loss deviation are difficult to plot. Typically, the process of calculating and analyzing characteristics of each interconnect may be long and complex process.

In many embodiments, the current disclosure may enable a user to easily process multiple S-parameter data files. In various embodiments, the current disclosure may enable a user to automatically calculate and plot insertion loss, return loss, mode conversion, crosstalk, integrated crosstalk noise and may apply limit lines to determine specification compliance, maintaining consistency between measurements. In some embodiments, the current disclosure may enable a user to create PowerPoint reports with any template and project details. In certain embodiments, the current disclosure may enable automatic power point report generation.

In many embodiments, specification compliance may be done automatically by applying limit lines that compare measured data with standards and determine whether measurement complies with standards. In various embodiments, the current disclosure may automate calculations such as Integrated Crosstalk Noise, Fitted Insertion Loss and Insertion Loss Deviation. In certain embodiments, coefficients of fitted insertion loss may be extracted to further develop standards.

In many embodiments, the current disclosure may enable calculation of integrated crosstalk noise from S-parameters using integrated crosstalk noise constraints from any standard. In various embodiments, the current disclosure may enable single-ended to multimode matrix conversion as well as MDNEXT and MDFEXT calculation from individual disturbers. In certain embodiments, disturbers may include noise created by adjacent signals (i.e., crosstalk). In some embodiments, the current disclosure may enable a user to make fitted insertion loss and insertion loss deviation calculations. In various embodiments, limit lines may be automatically applied to enable easy assessment of interconnects (i.e., does an interconnect comply with specifications). In certain embodiments, the current disclosure may enable automatic PowerPoint report generation with any template and project details.

In many embodiments, the current disclosure may enable a user to take a collection of measurements of parameters of one or more interconnects and quickly analyze the measurements to determine one or more characteristics of each interconnect. In some embodiments, the current disclosure may enable the automation of the analysis of one or more parameters used to determine characteristics of an interconnect. In many embodiments, the parameters used may include S-parameters, Z-parameters, Y-parameters, and T parameters (also known as ABCD parameters). In several embodiments, interconnects may include printed circuit boards, connectors, or cabling. In certain embodiments, the current disclosure may enable a user to output calculated and analyzed characteristics to compare statistics of individual interconnects. In many embodiments, the current disclosure may enable a user to output and compare calculated and analyzed characteristics of groups, or batches, of interconnects. In some embodiments, the one or more parameters and/or configuration information may be provided in a document, spreadsheet, or in a configurable input format (i.e., text file, spread sheet, xml file).

In certain embodiments, the current disclosure may enable a user to analyze S-parameters to determine characteristics of interconnects. In many embodiments, S-parameters may describe the electrical behavior of interconnects while undergoing various steady state stimuli. In some embodiments, many properties of interconnects may be expressed using the measured S-parameters, such as gain, return loss, voltage, standing wave ratio, reflection coefficient, and amplifier stability.

In many embodiments, S-parameters may be measured using a Vector Network Analyzer (VNA), one or more test boards, and one or more interconnects. In some embodiments, the measured S-parameters may include bias information from the one or more test boards used while measuring the S-parameters. In certain embodiments, the current disclosure may enable a user to de-embed the bias information from the measured S-parameters. In various embodiments, the current disclosure may enable an analysis tool to communicate with a VNA to retrieve measurements of interconnects being tested. In some embodiments, the current disclosure may enable an analysis tool to communicate with a VNA to retrieve measures of interconnects stored on the VNA.

In some embodiments, the current disclosure may enable a user to create specifications requirements based on measured parameters recorded by a VNA and estimated parameters. In certain embodiments, a user may be enabled to determine build requirements of an interconnect based on measured S-Parameters. In various embodiments, the current disclosure may enable a user to create specification requirements based on desired parameter measurements. In certain embodiments, the current disclosure may be enabled to produce output, such as: ICN: integrated crosstalk noise, ILD: insertion loss deviation, MDFEXT multi disturber far end cross talk, MDNEXT: multi disturber near end cross talk, impedance plot or TDR plot: Time domain reflectometer, Mixed Mode S-Parameter plots, and regular parameter plots of measured data.

In many embodiments, a method for analyzing an interconnect using a vector network analyzer may include receiving measurements of an interconnect from the vector network analyzer in the form of one or more parameters, analyzing the one or more parameters to determine a characteristic of the interconnect, and outputting the characteristic of the interconnect. In some embodiments, the one or more parameters may include S-Parameters or Z-Parameters measured from testing one or more interconnects with the vector network analyzer. In certain embodiments, the interconnects may include printed circuit boards, connectors, or cabling used in building or configuring data storage systems.

Refer to the example embodiment in FIG. 1. FIG. 1 illustrates an example embodiment of parameter analyzer. As shown, parameter analyzer 120 receives input 125 from user 105. In this embodiment, input 125 includes parameter inputs 115 and configuration information 110. Parameter inputs 115 include measured S-Parameter data measured from one or more interconnects to be analyzed by parameter analyzer 120. As shown in FIG. 1, Parameter Analyzer 120 is enabled to transform input 125 into output 135, wherein output 135 includes plot 140. In many embodiments, a plot may include representations of the measured S-parameters describing insertion loss, insertion loss deviation, or crosstalk of the one or more interconnects.

Figure 2:
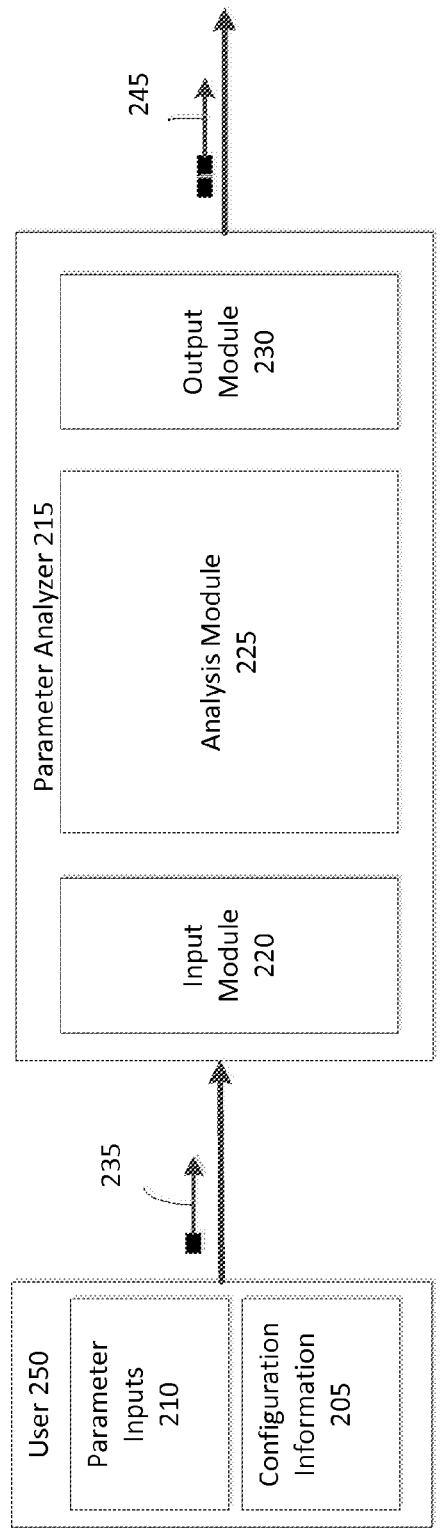
FIG. 2 is an alternative simplified illustration of an S-Parameter Analysis Tool, in accordance with an embodiment of the present disclosure.

Refer to the example embodiment of FIG. 2. FIG. 2 illustrates an example embodiment of a parameter analyzer. Parameter analyzer 215 includes input module 220, analysis module 225, and output module 230. In this embodiment, each module executes different functionalities. Input module 220 receives input 235 from user 250. Input module 220 is enabled to interpret and configure input 235 for use by analysis module 225. In some embodiments, an input module may include a graphical user interface. Analysis module 225 is enabled to take information from input 235 to make calculations to determine one or more characteristics of each interconnect measured. As shown, output module 230 is enabled to process output from analysis module 225 to provide message 245 containing plots, graphs, or other statistical and/or characteristic information of the one or more interconnects that are analyzed by parameter analyzer 215.

Figure 3:
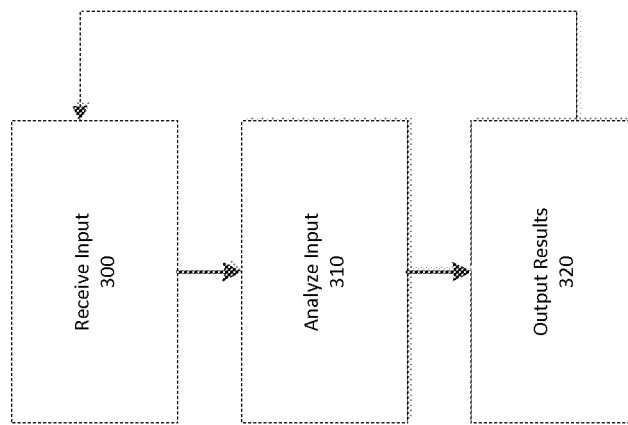
FIG. 3 is an example embodiment of a method of analyzing S-Parameters, in accordance with an embodiment of the present disclosure.

Refer to the example embodiments of FIGS. 2 and 3. FIG. 3 illustrates a simplified flowchart of how a parameter analyzer may analyze an input, such as the input of FIG. 2. Parameter analyzer 215 receives input 235 (Step 300) from user 250. In this embodiment, parameter analyzer 215 analyzes input 235 (Step 310). As shown in FIG. 3, analysis module 225 calculates one or more characteristics using information received from input 235. Analysis module 225 is enabled to make calculations, such as determining insertion loss, insertion loss deviation, or crosstalk. Parameter analyzer 215 outputs results (Step 320) using output module 230. In this embodiment, output 245 includes calculated statistical information of one or more interconnects. In some embodiments, the output may include one or more plots, charts, or graphs to visually illustrate characteristics of one or more interconnects. In certain embodiments, a user may use the one or more plots to determine if each interconnect performs up to defined capabilities.

Figure 4:
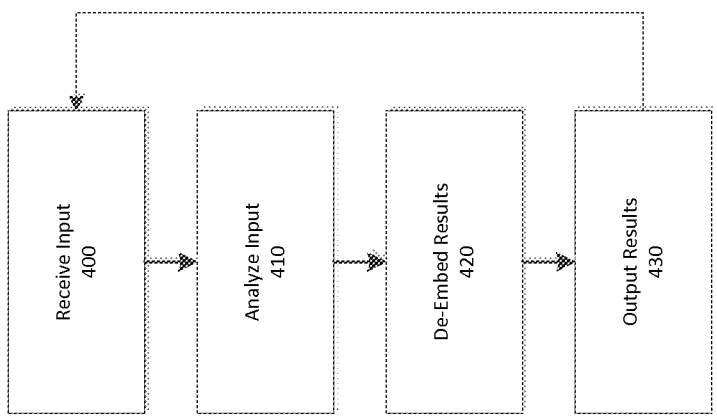
FIG. 4 is an alternative example embodiment of a method of analyzing S-Parameters, in accordance with an embodiment of the present disclosure.

Refer to example embodiments of FIGS. 2 and 4. FIG. 4 illustrates a simplified flowchart of how a parameter analyzer analyzes and de-embeds results as shown in FIG. 2. Parameter analyzer 215 receives input 235 (Step 400) from user 250. Parameter analyzer 215 analyzes input (Step 410). In this embodiment, parameter analyzer 215 de-embeds the results (Step 420) and outputs the de-embedded results (Step 430) in output 245. In many embodiments, the inputs to the parameter analyzer may include measured s-parameters having a bias from a test board used while making measurements. As such, parameter analyzer 215 is enabled to remove an affect of the bias from output 245. In this embodiment, configuration information 205 and parameter inputs 210 contain information to remove test board bias from each measured S-parameter.

Figure 5:
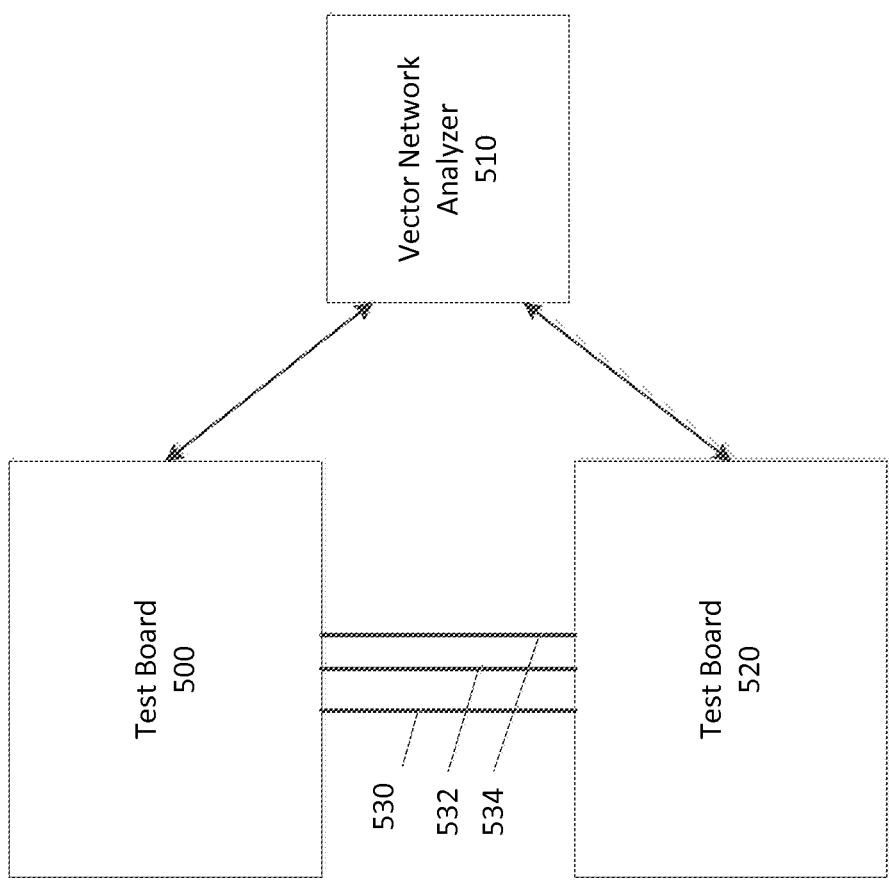
FIG. 5 is an simplified illustration of an interconnect analysis tool, in accordance with an embodiment of the present disclosure.

Refer to the example embodiment of FIG. 5. FIG. 5 illustrates an example embodiment of a vector network analyzer measuring S-parameters. Vector network analyzer (VNA) 510 is communicatively coupled to test board 500 and test board 520. VNA 510 is communicatively coupled with both test boards 500, 520. In this embodiment, Test board 500 and test board 520 are configured to use interconnects 530, 532, 534. VNA 510 is enabled to measure S-parameters based on communication from Test board 500 to Test board 520 through interconnects 530, 532, 534. As shown, VNA 510 retrieves bias information from Test boards 500, 520 for later use in de-embedding bias from measured S-parameter values.

Figure 6:
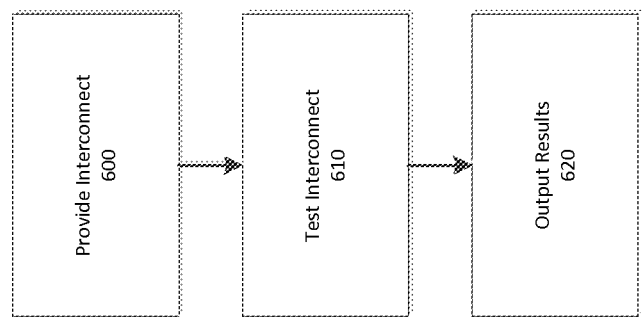
FIG. 6 is an example embodiment of a method of using an analysis tool to collect S-Parameters data, in accordance with an embodiment of the present disclosure.

Refer to the example embodiments of FIGS. 5 and 6. FIG. 6 illustrates a simplified flowchart of a VNA being used as shown in FIG. 5. As shown, interconnects 530, 532, 534 are provided (Step 600) for testing with test boards 500, 520. In this embodiment, interconnects 530, 532, 534 are cables used to connect one or more components in a data storage systems. In various embodiments, interconnects may include printed circuit boards, connectors, or cabling. Test boards 500, 520 is enabled to be used to test interconnects 530, 532, 534 (Step 610) by transmitting signals through each interconnect. As shown, VNA 510 is connected to the test boards 500, 520 to measure one or more parameter to determine one or more characteristics of the cabling. VNA 510 is enabled to output results (Step 620) of measured S-parameters for use with a parameter analyzer tool.

Figure 7:
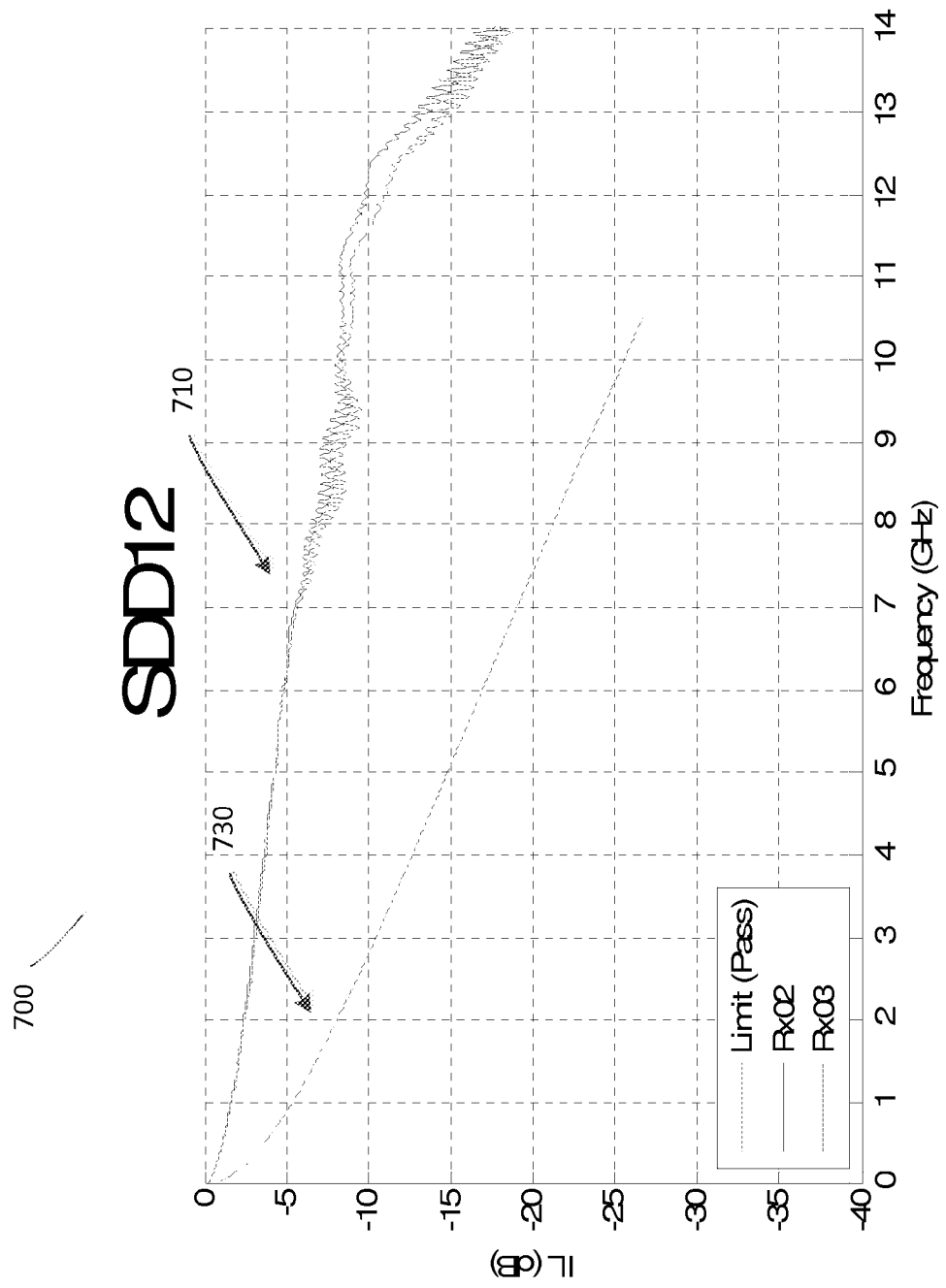
FIG. 7 is a simplified illustration of output of an S-Parameter analysis tool, in accordance with an embodiment of the present disclosure.

Refer to the example embodiment of FIG. 7. FIG. 7 illustrates a sample plot produced by the parameter analyzer. As shown in FIG. 7, plot 700 is an S-parameter graph showing insertion loss from start to finish. In FIG. 7, plot 700 is showing how much signal loss is happening versus frequency. For example, if the loss was at 0 across frequency, the plot would have no loss. As shown, plot 700 includes S-parameter measurements 710 of an interconnect tested by a VNA. In this embodiment, a user has chosen to compare S-parameter measurements 710 with threshold 730 to determine whether an interconnect complies with minimum requirements desired by the user.

Figure 8:
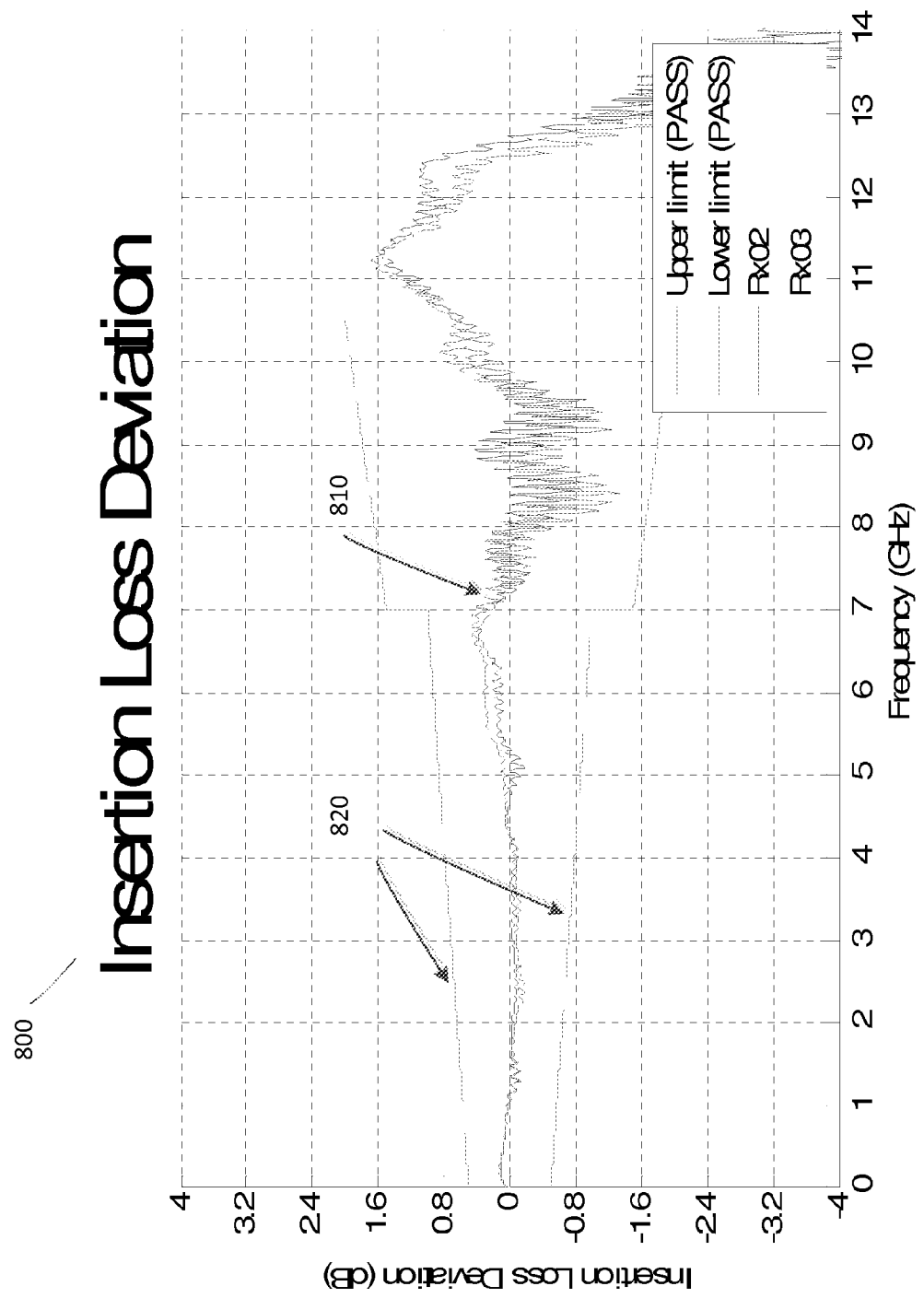
FIG. 8 is a further simplified illustration of output of an S-Parameter analysis tool, in accordance with an embodiment of the present disclosure.

Refer to the example embodiment of FIG. 8. FIG. 8 illustrates a sample plot produced by a parameter analyzer. As shown, Plot 800 is an S-parameter graph showing insertion loss deviation. Insertion loss deviation is compared to upper and lower limits 820 to determine compliance with specifications for a given interconnect. As shown in FIG. 8, arrow 810 points to increased deviation in insertion loss as the frequency in the interconnect is increased.

Figure 9:
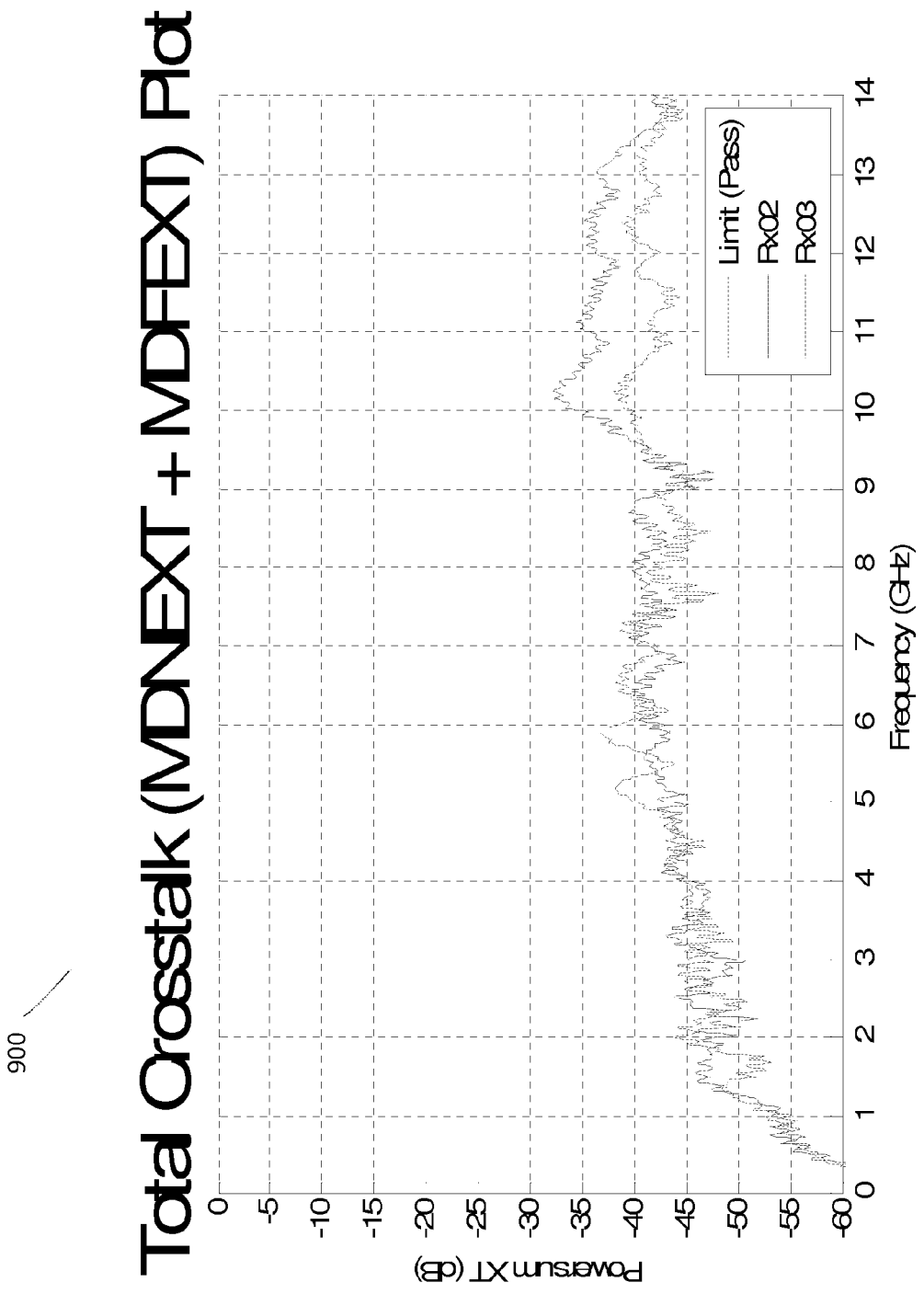
FIG. 9 is an alternative simplified illustration of output of an S-Parameter analysis tool, in accordance with an embodiment of the present disclosure.

Refer to the example embodiment of FIG. 9. FIG. 9 illustrates a sample plot produced by the parameter analyzer. As shown, Plot 900 is an S-parameter graph showing total crosstalk across multiple frequencies used on an interconnect.

Figure 10:
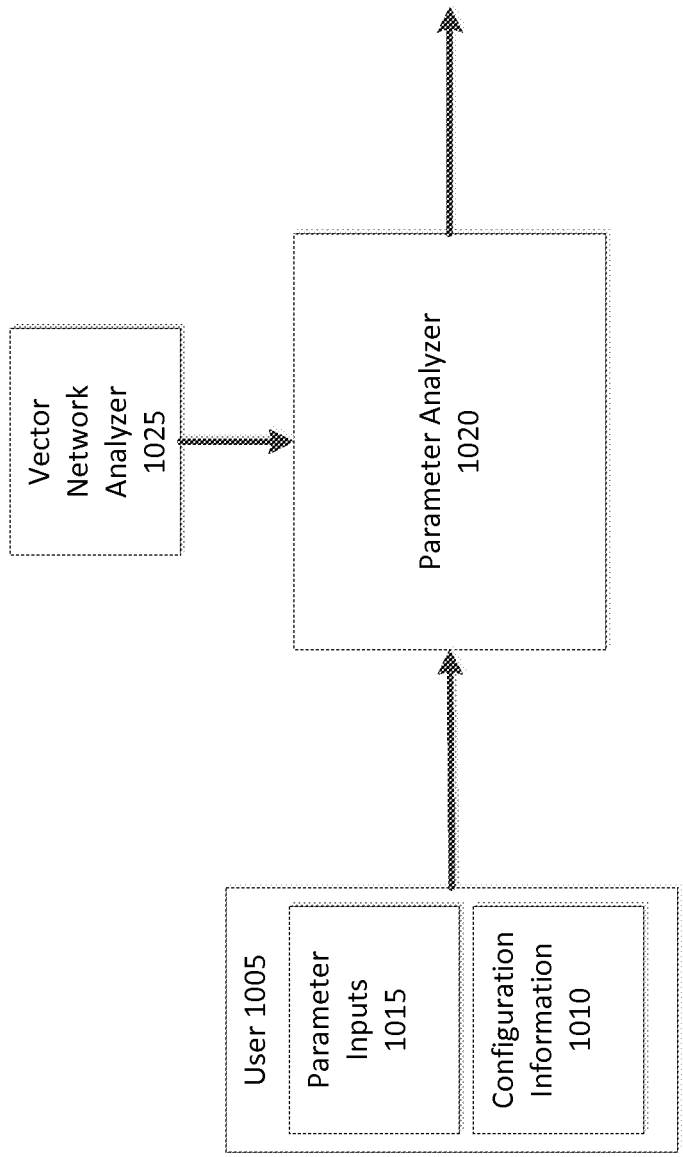
FIG. 10 is an illustration of an S-Parameter analysis tool in communication with a vector network analyzer, in accordance with an embodiment of the present disclosure.

Refer to the example embodiment of FIG. 10. FIG. 10 illustrates an example embodiment of a vector network analyzer (VNA) connected to a parameter analyzer. As shown, parameter analyzer 1020 is enabled to receive input from user 1005. In this embodiment, parameter analyzer 1020 is communicatively coupled to VNA 1025. Parameter analyzer 1020 is enabled to receive input information from VNA 1025. In various embodiments, a parameter analyzer tool may receive measured inputs from a user or a VNA connected to the parameter analyzer tool.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 11:
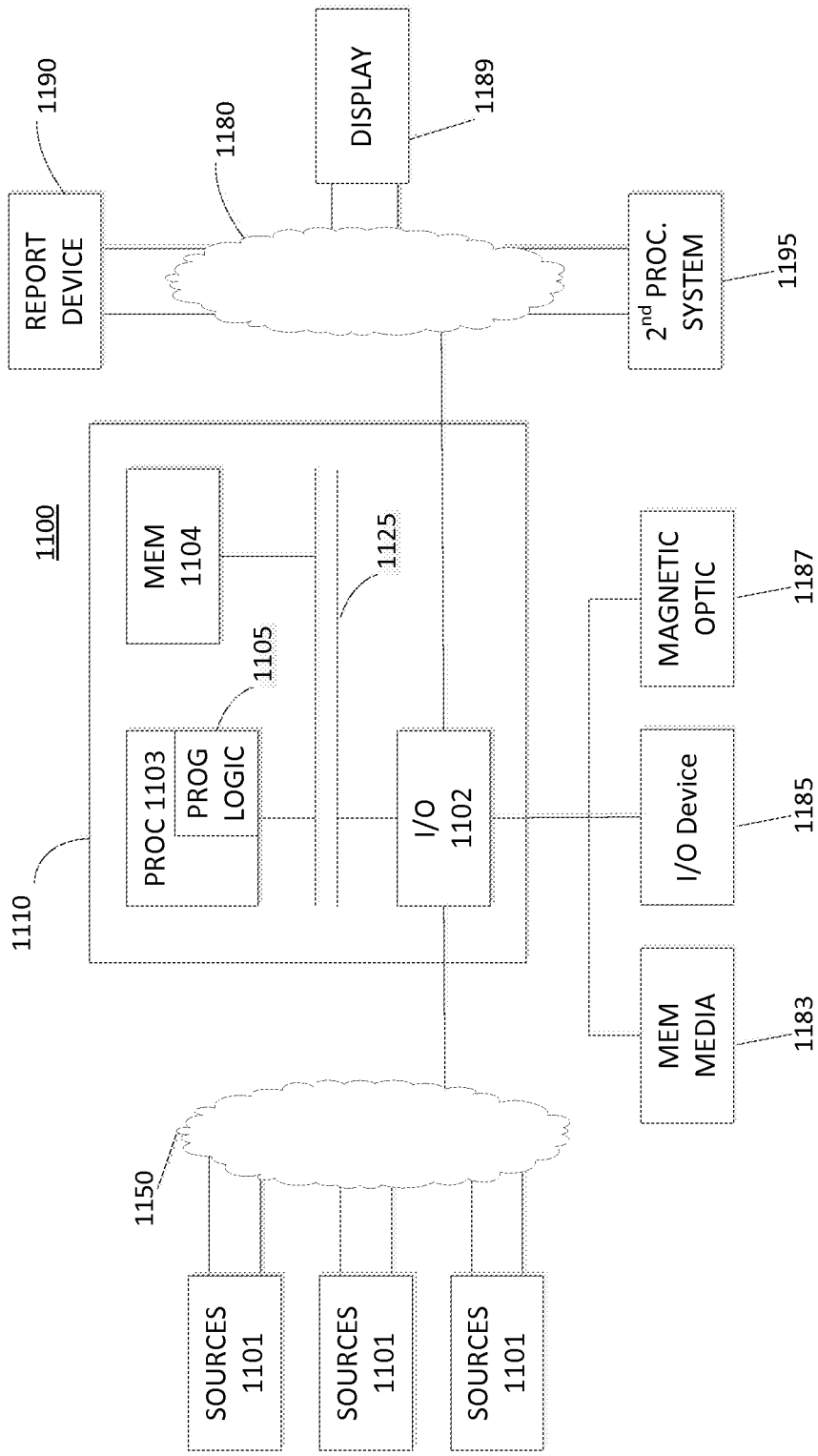
FIG. 11 is an example of an embodiment of an apparatus that may utilize the techniques described herein, in accordance with an embodiment of the present disclosure.

FIG. 11 is a block diagram illustrating an apparatus, such as a computer 1110 in a network 1100, which may utilize the techniques described herein according to an example embodiment of the present invention. The computer 1110 may include one or more I/O ports 1102, a processor 1103, and memory 1104, all of which may be connected by an interconnect 1125, such as a bus. Processor 1103 may include program logic 1105. The I/O port 1102 may provide connectivity to memory media 1183, I/O devices 1185, and drives 1187, such as magnetic or optical drives. When the program code is loaded into memory 1104 and executed by the computer 1110, the machine becomes an apparatus for practicing the invention. When implemented on one or more general-purpose processors 1103, the program code combines with such a processor to provide a unique apparatus that operates analogously to specific logic circuits. As such, a general purpose digital machine can be transformed into a special purpose digital machine.

Figure 12:
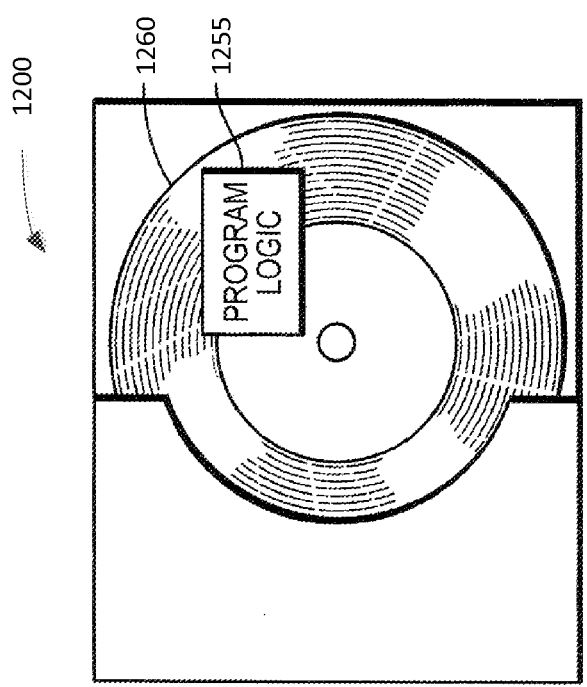
FIG. 12 is an example of a method embodied on a computer readable storage medium that may utilize the techniques described herein, in accordance with an embodiment of the present disclosure.

FIG. 12 is a block diagram illustrating a method embodied on a computer readable storage medium 1260 that may utilize the techniques described herein according to an example embodiment of the present invention. FIG. 12 shows Program Logic 1255 embodied on a computer-readable medium 1260 as shown, and wherein the Logic is encoded in computer-executable code configured for carrying out the methods of this invention and thereby forming a Computer Program Product 1200. Program Logic 1255 may be the same logic 1105 on memory 1104 loaded on processor 1103 in FIG. 11. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for analyzing an interconnect using a vector network analyzer and a test board, the computer-executable method comprising:

determining a bias for the test board;
receiving one or more parameters from the vector network analyzer, wherein the vector network analyzer acquires the one or more parameters from the interconnect, wherein the interconnect is a physical connection;
analyzing, using the bias, the one or more parameters to determine a characteristic of the interconnect; and
outputting the characteristic of the interconnect.

2. The computer-executable method of claim 1, wherein the receiving comprises:
communicating with the vector network analyzer, wherein the vector network analyzer is coupled to a test board enabled to test the interconnect;
configuring the vector network analyzer to test the interconnect; and
retrieving the one or more parameters from the vector network analyzer.

3. The computer-executable method of claim 2, wherein the analyzing comprises:
de-embedding an effect of the test board on the one or more parameters; and
determining the characteristic of the interconnect.

4. The computer-executable method of claim 1, wherein the one or more parameters includes an S-parameter.

5. The computer-executable method of claim 1, further comprising:
creating a configuration file, wherein the configuration file includes a type of characteristic to output; and
inputting the configuration file.

6. The computer-executable method of claim 1, wherein the interconnect is a cable.

7. The computer program product for analyzing an interconnect using one or more parameters retrieved from a vector network analyzer coupled to the interconnect and a test board, the computer program product comprising:
a non-transitory computer readable medium encoded with computer-executable program code for using read signatures in replication, the code configured to enable the execution of:
determining a bias for the test board;
receiving one or more parameters from the vector network analyzer, wherein the vector network analyzer acquires the one or more parameters from the interconnect, wherein the interconnect is a physical connection;
analyzing, using the bias, the one or more parameters to determine a characteristic of the interconnect; and
outputting the characteristic of the interconnect.

8. The computer program product of claim 7, wherein the receiving comprises:
communicating with the vector network analyzer, wherein the vector network analyzer is coupled to a test board enabled to test the interconnect;
configuring the vector network analyzer to test the interconnect; and
retrieving the one or more parameters from the vector network analyzer.

9. The computer program product of claim 8, wherein the analyzing comprises:
de-embedding an effect of the test board on the one or more parameters; and
determining the characteristic of the interconnect.

10. The computer program product of claim 7, wherein the one or more parameters includes an S-parameter.

11. The computer program product of claim 7, further comprising:
creating a configuration file, wherein the configuration file includes a type of characteristic to output; and
inputting the configuration file.

12. The computer program product of claim 7, wherein the interconnect is a cable.

13. A system, comprising:
an interconnect;
a test board coupled to the interconnect;
a vector network analyzer coupled to the interconnect and the test board; and
Computer-executable program logic encoded in memory of one or more computers enabled to analyze the interconnect using the vector network analyzer and the test board, wherein the computer-executable program logic is configured for the execution of:
determining a bias for the test board;
receiving one or more parameters from the vector network analyzer, wherein the vector network analyzer acquires the one or more parameters from the interconnect, wherein the interconnect is a physical connection;
analyzing, using the bias, the one or more parameters to determine a characteristic of the interconnect; and
outputting the characteristic of the interconnect.

14. The system of claim 13, wherein the receiving comprises:
communicating with the vector network analyzer, wherein the vector network analyzer is coupled to a test board enabled to test the interconnect;
configuring the vector network analyzer to test the interconnect; and
retrieving the one or more parameters from the vector network analyzer.

15. The system of claim 14, wherein the analyzing comprises:
de-embedding an effect of the test board on the one or more parameters; and
determining the characteristic of the interconnect.

16. The system of claim 13, wherein the one or more parameters includes an S-parameter.

17. The system of claim 13, wherein the computer-executable program logic is further configured for the execution of:
creating a configuration file, wherein the configuration file includes a type of characteristic to output; and
inputting the configuration file.

18. The system of claim 13, wherein the interconnect is a cable.

* * * * *